United States Patent
Roehling

(10) Patent No.: US 9,239,088 B2
(45) Date of Patent: Jan. 19, 2016

(54) BRAKE LINING HAVING ADAPTER FOR DISC BRAKES

(75) Inventor: Willmut Roehling, Ruppichteroth (DE)

(73) Assignee: TMD Friction Services GmbH, Leverkusen (DE)

( * ) Notice: Subject to any disclaimer, the term of this patent is extended or adjusted under 35 U.S.C. 154(b) by 335 days.

(21) Appl. No.: 12/937,383

(22) PCT Filed: Feb. 25, 2009

(86) PCT No.: PCT/EP2009/001316
§ 371 (c)(1),
(2), (4) Date: Oct. 12, 2010

(87) PCT Pub. No.: WO2009/127293
PCT Pub. Date: Oct. 22, 2009

(65) Prior Publication Data
US 2011/0024244 A1 Feb. 3, 2011

(30) Foreign Application Priority Data
Apr. 14, 2008 (DE) .......................... 10 2008 019 003

(51) Int. Cl.
*F16D 69/00* (2006.01)
*F16D 65/092* (2006.01)

(52) U.S. Cl.
CPC .................................. *F16D 65/092* (2013.01)

(58) Field of Classification Search
CPC .. F16D 2125/28; F16D 65/092; F16D 65/095
USPC ............... 188/72.6, 72.7, 73.1, 73.37, 205 R, 188/251 R, 254, 255, 256, 258, 261, 250 D, 188/250 E, 250 G, 250 B
See application file for complete search history.

(56) References Cited

U.S. PATENT DOCUMENTS 4,240,530 A * 12/1980 Tillenburg ................. 188/250 E
4,914,801 A * 4/1990 Sweetmore et al. ......... 29/469.5
(Continued)

FOREIGN PATENT DOCUMENTS

CN 101033783 A 9/2007
DE 2751194 A1 5/1979
(Continued)

OTHER PUBLICATIONS

Machine Translation of DE 8710924 (no date).*
(Continued)

*Primary Examiner* — Nicholas J Lane
(74) *Attorney, Agent, or Firm* — Panitch Schwarze Belisario & Nadel LLP

(57) ABSTRACT

A brake lining, particularly for a commercial vehicle disc brake, and an associated adapter (5, 6), and a disc brake having said brake lining and the adapter (5, 6) for commercial vehicles have a carrier plate (1) with a friction lining (2) disposed thereon and at least one force application region (3, 4) on the side thereof facing away from the friction lining (2). An adapter (5, 6) is in a contact position with the force application region (3, 4) in the operating position of the brake. The adapter, in turn, is in working contact with a brake plunger or a brake piston. In order to fix the adapter (5, 6) and the carrier plate (1) at least in the radial direction (11) and circumferential direction (12), mounting means (7, 8) are provided on the carrier plate (1), with corresponding mounting means (9, 10) provided on the adapter. The adapter (5, 6) is thereby simply disposed on the force application regions of the carrier plate (1) and releaseably connected thereto.

12 Claims, 1 Drawing Sheet

(56) References Cited

U.S. PATENT DOCUMENTS

| | | | |
|---|---|---|---|
| 5,429,216 A * | 7/1995 | Kahr | 188/250 R |
| 5,494,140 A * | 2/1996 | Weiler et al. | 188/73.38 |
| 5,515,950 A * | 5/1996 | Kwolek | 188/73.36 |
| 5,538,104 A * | 7/1996 | Katz et al. | 188/73.1 |
| 5,743,361 A * | 4/1998 | Winter | 188/250 G |
| 5,829,557 A | 11/1998 | Halasy-Wimmer et al. | |
| 5,842,546 A * | 12/1998 | Biswas | 188/73.37 |
| 5,890,566 A * | 4/1999 | Yoshida et al. | 188/73.1 |
| RE36,313 E | 9/1999 | Kahr | |
| 7,000,742 B2 * | 2/2006 | Heinlein | 188/72.9 |
| 2006/0021831 A1 * | 2/2006 | Yamamoto | 188/72.7 |
| 2007/0029142 A1 * | 2/2007 | Drennen et al. | 188/72.7 |
| 2007/0029143 A1 * | 2/2007 | Adachi et al. | 188/72.8 |
| 2007/0107996 A1 | 5/2007 | Gruber et al. | |
| 2007/0209891 A1 | 9/2007 | Stensson et al. | |
| 2008/0271963 A1 | 11/2008 | Macke et al. | |
| 2010/0038194 A1 | 2/2010 | Emmett et al. | |
| 2010/0140029 A1 * | 6/2010 | Parild et al. | 188/73.37 |

FOREIGN PATENT DOCUMENTS

| | | | | |
|---|---|---|---|---|
| DE | 3013862 A1 | 10/1981 | | |
| DE | 8710924 U1 | 9/1987 | | |
| DE | 19511287 A1 | 1/1996 | | |
| DE | 19754740 A1 | 3/1999 | | |
| DE | 102005009398 A1 | 10/2005 | | |
| DE | 102005050581 B3 | 6/2007 | | |
| DE | 102006010754 A1 | 9/2007 | | |
| DE | 102007001378 | * | 7/2008 | F16D 65/847 |
| EP | 2118513 A1 | 11/2009 | | |
| GB | 2074261 | 10/1981 | | |
| JP | 2008014453 A | 1/2008 | | |
| JP | 2008014453 A | 1/2008 | | |
| WO | WO 2007045493 A1 * | 4/2007 | | F16D 65/092 |

OTHER PUBLICATIONS

Machine Translation of DE 19754740 (no date).*

Machine Translation of DE 10 2007 001378 (no date).*

Office Action issued May 19, 2015 in China Application No. 200980113245.2.

International Search report issued May 19, 2015 in Int'l Application No. 200980113245.2.

* cited by examiner

BRAKE LINING HAVING ADAPTER FOR DISC BRAKES

CROSS-REFERENCE TO RELATED APPLICATIONS

This application is a national stage application (under 35 U.S.C. §371) of PCT/EP2009/001316, filed Feb. 25, 2009, which claims benefit of German application 10 2008 019 003.9, filed Apr. 14, 2008.

DESCRIPTION

The present invention relates to a brake lining, particularly for the disc brake of a commercial vehicle, comprising a carrier plate and a friction lining arranged thereon, whereby the carrier plate, on its side facing away from the friction lining, has a force-application zone with which an adapter that is operationally connected to a brake cam comes into contact when the brake is in its operating position, whereby, in order to affix the adapter and the carrier plate, at least in the radial direction and in the circumferential direction, relative to the geometry of the brake disc, holding means are provided on the carrier plate that correspond to holding means provided on the adapter side. Moreover, the invention also relates to an adapter as well as to a disc brake having such a brake lining.

BACKGROUND AND STATE OF THE ART

Disc bakes are now being employed more and more often, not only in passenger cars but also in commercial vehicles having a total permissible weight of tens of tons. Owing to the greater mass and engine capacity of these vehicles, such disc brakes have to meet special requirements in terms of their braking capacity and reliability.

A brake lining having the above-mentioned features has already been disclosed in German patent application DE 197 54 740 A1. Here, the brake shoe has a lining carrier consisting of two laminarly arranged carrier elements. These two carrier elements are made of different materials in order to positively influence, on the one hand, the heat-transfer behavior of the brake shoe and, on the other hand, the generation of braking noise. These two carrier elements are joined to each other using an adhesive interlayer. For purposes of strengthening the bond of the two carrier elements to each other, especially in the circumferential direction, one of the carrier elements has angled tabs that extend into correspondingly shaped pockets of the other carrier element so as to interlock. This is intended to ensure a reliable transmission of longitudinal force between the carrier elements.

Furthermore, German patent application DE 10 2005 009 398 A1 describes a pair of brake linings for a disc brake, whereby the lining carrier plate has different configurations and dimensions that are adapted as a function of the occurring loads, especially the bending loads, and of the installation space available for the brake calipers. Thus, it is provided, for example, for the lining carrier plate to be made of a cast part, whereby the lining carrier plate can have depressions or elevations as well as holes that correspond to and interlock with the friction lining. In this context, the lining carrier plate is preferably made as a cast part, which allows a flexible shaping of the lining carrier plate, for instance, with reinforcement ribs and interlocking parts.

The configuration of the lining carrier plates as cast parts rather than as a sheet metal part such as a steel plate is only cost-effective in large production runs. Since the market for commercial vehicles cannot be compared to that of passenger cars and also because there is a high level of diversity among the various types of brakes, the brake linings of a given brake type are only manufactured in relatively small production runs.

Moreover, the lining carrier plates described in German patent application DE 10 2005 009 398 A1 have a quite complex inner geometry in order to be able to adequately meet the strength and load requirements. The configuration and design as well as the production of such lining carrier plates, for instance, with strengthening struts, is relatively expensive and complicated in view of the geometry being adapted to the loads that occur. Last but not least, a relatively large amount of material is needed for such brake linings and lining carrier plates, so that in the final analysis, their total weight increases.

SUMMARY OF THE INVENTION

In contrast, the present invention is based on an objective of putting forward a brake lining or a brake lining assembly that is easy and cost-effective to produce. Moreover, it should be possible to reduce the material consumption and conceivably to recover and reutilize the individual components. Furthermore, an improvement should be made in the acoustic and thermal decoupling between the brake lining and the brake cam that exerts the clamping force that acts on the brake lining. It is likewise an objective of the invention to reduce the weight of the brake lining and associated components.

A brake lining according to the invention may be specially configured and dimensioned for disc brakes of commercial vehicles. It has a lining carrier plate and a friction lining arranged thereon, whereby the friction lining can be made to frictionally engage with a rotating brake disc when the braking operation is initiated. On the side of the carrier plate facing away from the friction lining, there is at least one force-application zone. In the installed or operating position of the brake, an adapter comes into contact with this force-application zone of the carrier plate. This adapter, in turn, is operationally connected to the brake cam or to the brake piston, optionally to its pressure piece. Therefore, the adapter is in the force-transmission line between the brake cylinder or brake cam and the brake lining or carrier plate that is mounted so as to be movable in the axial direction. In particular, the adapter has a pressure-distributing function. Thus, it is provided for the adapter to distribute the clamping forces exerted on it by the brake cam essentially uniformly over the force-application zone, so that the pressure effect generated over the force-application zone can be as homogenous as possible. Moreover, the adapter and the carrier plate are affixed with respect to each other in the radial direction and in the circumferential or peripheral direction of the brake disc, relative to the geometry of said brake disc. For this purpose, holding means are provided at least on the carrier plate, and these are configured to align the adapter on the carrier plate, at least in the two indicated directions, and to affix it there. Corresponding holding means are provided or formed directly on the carrier plate as well as on the adapter, and they prevent the adapter from slipping vis-à-vis the carrier plate perpendicular to the axial direction that coincides with the axis of rotation of the brake disc.

The adapter is arranged only on the force-application zones of the carrier plate and detachably joined to it. This measure means that, on the one hand, the parts of the carrier plate that lie outside of the force-application zone can be configured with thinner walls than had been the case so far and, on the other hand, the adapter can be reused or recovered when the friction lining of the brake lining is worn out.

In particular, the use of this adapter makes it possible to configure the lining carrier plate as a steel plate or as a sheet metal part, so that there is no need to use cast parts, thus reducing the weight as well as the costs, without any significant loss of the mechanical strength or load stability of the lining carrier plate. Furthermore, the adapter according to the invention can be reused and recovered. For instance, if the friction lining of the brake lining is worn out over the course of proper utilization, the friction lining and the brake lining with the lining carrier plate can be replaced, while the associated adapter can continue to be used. This modular or building-block structure of the brake lining kit allows the lining carrier plate to be configured with thinner walls, which accounts for a cost advantage as well as a reduction in the weight and in the consumption of material.

According to an embodiment of the invention, it is provided that the holding means on the carrier plate side are arranged exclusively in the force-application zone of the carrier plate and are configured either as an elevation extending from the plane of the plate or as a projection and/or as a depression that is set back from, or that penetrates into, the plane of the plate.

In this context, it is also provided that the associated holding means on the adapter side are configured as a corresponding elevation, projection or depression, so that, when the carrier plate and the adapter are placed one on top of the other in the axial direction, the holding means that are flush across from each other intermesh at the latest when the adapter comes into contact with the force-application zone of the carrier plate.

In another advantageous embodiment of the invention, it is provided that the holding means of the carrier plate and/or the holding means of the adapter occupy at the maximum 30%, preferably at the maximum 20%, preferably at the maximum 10% or at the maximum 5% of the surface area of the force-application zone. As far as the adapter is concerned, it is provided that the holding means occupy at the maximum 30%, 20%, 10% or at the maximum 5% of the surface area of the adapter that comes into contact with the force-transmission zone of the carrier plate in the operating position of the brake.

Since the holding means only make up a relatively small portion of the surface area of the force-application zone, the force applied by the brake cam onto the carrier plate can be distributed in a particularly homogenous and uniform manner over the remainder of the surface area.

According to a refinement, it is provided that the holding means configured as a depression is configured as a through-opening. This through-opening can be provided on the carrier plate as well as on the adapter. It is likewise provided for the holding means on the carrier plate side and/or on the adapter side to have a cylindrical or conical outer contour. A conical configuration can even affix the carrier plate and the associated adapter in the axial direction. Moreover, the side surfaces—which run at a slant—of conically configured projections or depressions can serve as an insertion aid during the alternating mounting of the lining carrier plate and the adapter.

According to another advantageous embodiment of the invention, it is provided that an elevation or depression that is formed on the force-application zone of the lining carrier plate and that is facing the adapter is associated with a corresponding depression or elevation that is formed on the side of the carrier plate and that is facing the friction lining. In other words, a projection formed on the carrier plate and facing the adapter is configured as a corresponding depression formed on the opposite side of the carrier plate and facing the friction lining.

The same can apply to a depression formed in the lining carrier plate and facing the adapter. This depression can be associated with an elevation penetrating into the friction lining or with a corresponding projection. In particular, the depressions or elevations and projections created in the lining carrier plate can be made by means of local material deformation. In particular, a cold-forming process can be carried out such as, for instance, stamping of a lining carrier plate made of steel.

According to a refinement of the invention, it is provided that the holding means are arranged centered and/or symmetrically with respect to the geometry of the force-application zone of the carrier plate. Thus, for example, it can be provided that the force-application zone is configured with a circular, rectangular or oval geometry, and one or more holding means, preferably with a cylindrical and thus circular geometry, are arranged in the middle of the force-application zone, or else, in the case of several holding means, these holding means are arranged symmetrically with respect to the central point or with respect to an axis that runs through the center of the force-application zone. Such a centered and/or symmetrical arrangement of the holding means with respect to the geometry of the force-application zone is beneficial for attaining a homogeneous characteristic curve of the force distribution.

Within the scope of the invention, it is also especially advantageous to configure the holding means in such a way that the adapter and the carrier plate are detachably joined to each other, or else affixed so as to be detachable from each other. It is especially provided that the holding means on the carrier plate side and/or on the adapter side are configured only for fixing the position in the plane perpendicular to the axial direction of the carrier plate and of the adapter. A final fixation and arrangement of the carrier plate or brake lining and of the adapter with respect to each other can only be achieved, for example, in the installed state inside the brake shoe when the geometry of the brake shoe and the geometry of the holding or return elements provided on the brake shoe effectively prevent an axial movement between the carrier plate and the adapter.

According to a refinement of the invention, it is provided that the adapter—already in a pre-assembly position, before the brake lining and the adapter have been inserted together into a lining shaft of the brake shoe—is detachably arranged by means of the holding means on the carrier plate side and/or on the adapter side on the side of the carrier plate facing away from the friction lining. In this context, the adapter and the brake lining can form a unit that is structurally joined but that can be detached from each other.

According to an especially advantageous refinement of the invention, it is provided that an insulating layer is arranged between the carrier plate and the adapter. This insulating layer has the function of providing thermal insulation as well as an acoustic decoupling between the adapter and the carrier plate. Accordingly, this insulating layer has vibration-absorbing properties. In particular, it is sufficiently elastic to at least partially compensate for and absorb the vibrations that occur during the braking operation. Moreover, the insulating layer is made of a material having a low thermal conductivity, so that not only an acoustic decoupling, but also, or alternatively, a thermal decoupling can be achieved between the brake lining and the brake cam.

In view of the high temperatures that occur during braking, thermal insulation in the range of several hundreds of degrees is of great significance for the proper functioning of the brake cam and thus of the entire brake. The insulating layer between the carrier plate and the adapter helps to prevent the braking cam from heating up beyond the maximum permissible value at which its functionality would be impaired, even at high braking temperatures. Therefore, this increases the failsafe performance of the entire brake.

Moreover, the arrangement of the insulating layer between two structurally separated components of the brake lining assembly or kit according to the invention is also advantageous in that, when a worn-out brake lining is replaced, the insulating layer can likewise be replaced. The adapter is largely free of wear and can continue to be used, while a new brake lining and a new insulating layer can once again reestablish braking behavior that is comparable to that of the brake in its new condition.

According to a refinement of the invention, it is provided that the holding means on the carrier plate side and/or on the adapter side pass through the insulating layer. Consequently, in the area of the holding means, the insulating layer has cutouts via which the adapter and the carrier plate can be affixed with respect to each other. Since the insulating layer is configured to be relatively elastic and soft in comparison to the material of the adapter or of the carrier plate, it would hinder a sort of positive connection in the plane transverse to the axial direction or transverse to the axis of the brake disc. In contrast, the fixation between the carrier plate and the adapter via the cutouts provided in the insulating layer is hardly noticeably affected.

Moreover, the size or the lateral extension of the holding means and of the corresponding cutouts in the insulating layer is of significance. Owing to the fact that the surface area of the holding means only makes up a small percentage of the total surface area of the force-application zone, and correspondingly, the cutout in the insulating layer only makes up a relatively small portion of the surface area of the insulating layer, a very good thermal and mechanical or acoustic decoupling can be achieved by means of the insulating layer.

The surface sections in the area of the corresponding holding means of the carrier plate and of the adapter are relatively small with respect to the total surface area of the force-application zone or of the total surface area of the insulating layer. They amount, at the maximum, to 30%, 20%, 10% or 5%. Only in this small partial area do the corresponding projections and depressions of the adapter and lining carrier plate come into direct contact, which could perhaps detrimentally affect the thermal and acoustic decoupling.

As an alternative or in addition to this, however, it can also be provided that the thickness of the insulating layer is selected to be somewhat greater than the elevation or depression of the holding means, so that, for instance, the front of a projection that protrudes from the carrier plate does not come into direct contact with the bottom of a corresponding depression of an adapter, but rather, a certain air gap is left between these two components, at least when the brake is delivered, said air gap contributing equally to achieving a thermal and an acoustic decoupling.

According to a refinement of the invention, it is provided that the insulating layer has a phenol-resin bonded compound. It is especially provided that graphite and/or aramid fibers are incorporated into the insulating layer. In this context, preferably various types of rubber materials such as, for instance, synthetic rubbers like butyl rubber (IIR), nitrile rubber (NWR), hydrated nitrile rubber (HNWR) and the like can be used. It is especially provided that the graphite and/or aramid fibers are incorporated into vulcanized rubber-like or phenol resin-like materials.

It is likewise provided that the carrier plate and/or the adapter are configured as a cast part or as a steel plate or as a sheet-metal part. Depending on the size of production run, the configuration as a cast part or as a steel plate can be advantageous. In any case, the invention can be equally applied to sheet-metal parts or cast parts.

According to another independent aspect, the invention relates to an adapter that is intended to be arranged between a pressure piece of a brake cam and a brake lining of the disc brake of a commercial vehicle. The adapter has holding means shaped onto it that are configured to at least affix the adapter and the brake lining, especially its lining carrier plate, in the radial direction and in the circumferential direction, relative to the geometry of the brake disc. Preferably, the carrier plate also has holding means that interact with the holding means on the adapter side, for purposes of affixing the adapter relative to the lining carrier plate. In this context, the adapter is merely arranged on the force-application zone of the carrier plates and is detachably joined to it.

The adapter preferably has a flat or disk-shaped outer contour that essentially corresponds to the contour of the force-application zone provided on the carrier plate. The holding means, which are configured or shaped onto the adapter and which are oriented towards the lining carrier plate, are configured as elevations that project from the adapter surface, and/or as depressions that are set back from the adapter surface. These elevations or depressions interact with corresponding depressions and elevations or projections of the lining carrier plate.

It is also provided that the adapter configured along the lines of a pressure-distribution plate has an elevation or a depression facing the carrier plate and, on the opposite side facing the brake cam, said adapter has a corresponding depression or elevation. In particular, the essentially flat adapter shaped like a disk or a block has a local material deformation in the area of the holding means. This deformation in the material can be made in a particularly cost-effective and efficient manner by means of a cold-forming process, especially by stamping an adapter plate made of steel.

It is likewise provided that the adapter has a thickness in its axial direction that is at least 1 to 3 times the thickness of the carrier plate. As a result, it can be advantageously ensured that, when the braking operation is initiated, the adapter undergoes essentially no undesired deformations, but rather, it has sufficient stability to allow the compressive force that has been exerted on it to be transmitted virtually unaltered to the lining carrier plate.

It is also provided that an insulating layer is arranged on the side of the adapter facing the carrier plate. This insulating layer can be detachably arranged on the carrier plate. As an alternative, the insulating layer can also be glued to the associated side of the lining carrier plate in a pre-assembly position. Particularly when a worn-out friction lining is being replaced, this makes it easy to detach the insulating layer from the adapter.

According to another independent aspect, the invention relates to a disc brake for commercial vehicles, said disc brake having at least one brake lining and one adapter, as described above.

DESCRIPTION OF THE DRAWINGS

Additional objectives, features as well as advantageous application possibilities of the present invention will be explained by the following description of an embodiment making reference to the drawings. In this context, all of the described and/or depicted features in any meaningful combination constitute the subject matter of the present application, also irrespective of the claims and the claims to which they refer back.

The following is shown.

DETAILED DESCRIPTION OF EMBODIMENTS

Figure 1:
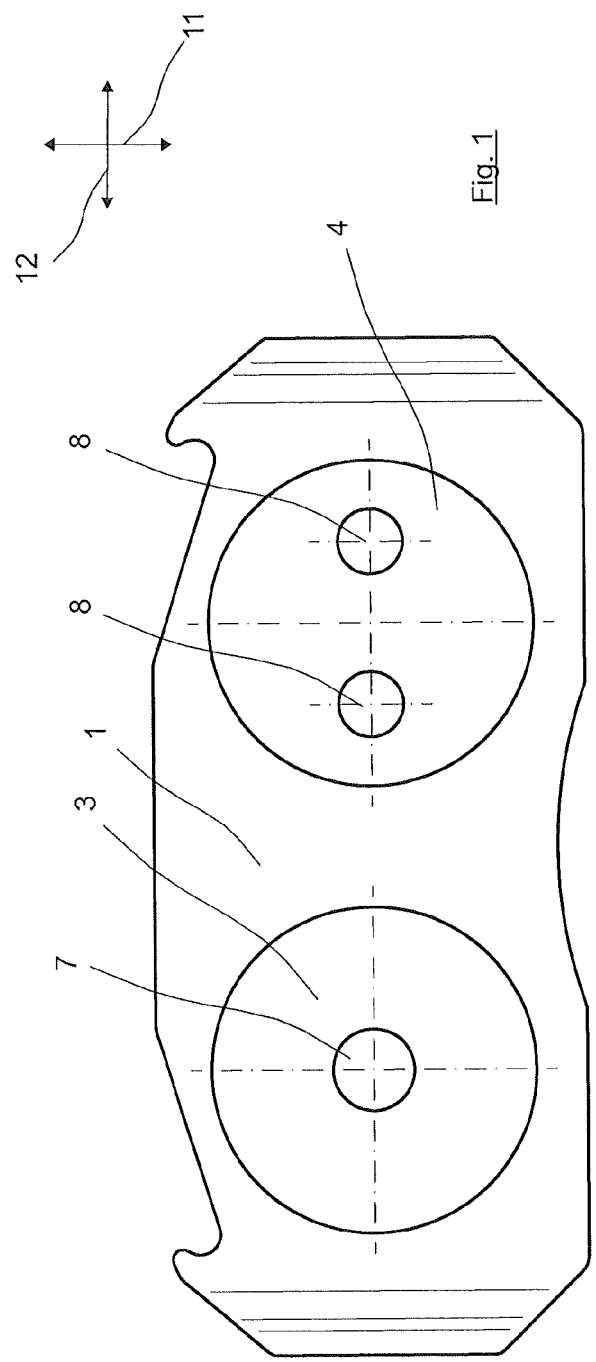
FIG. 1—a schematic top view of a friction lining.
Figure 2:
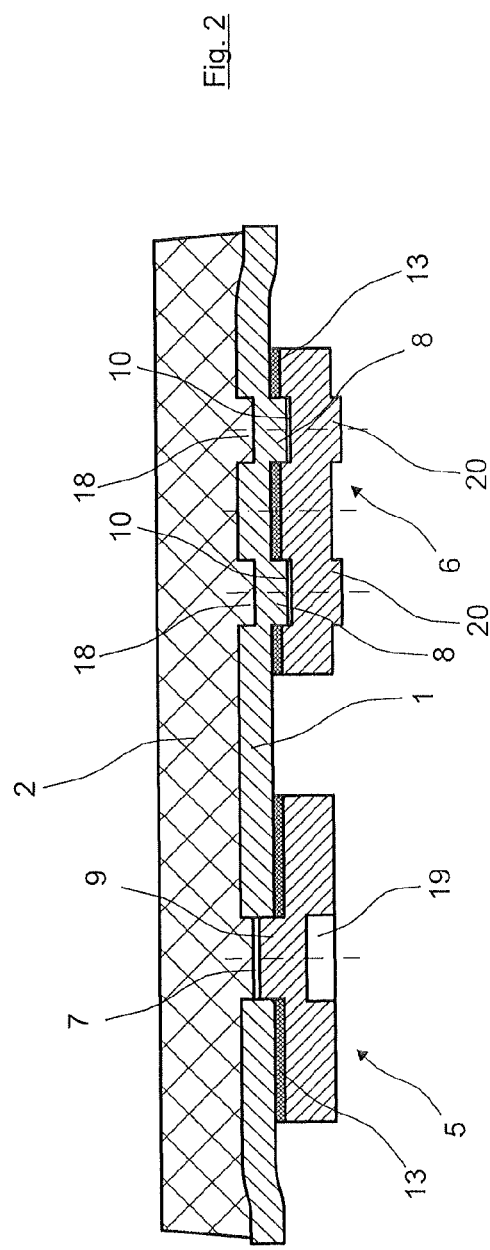
FIG. 2—a cross sectional view of the friction lining with an installed adapter according to FIG. 1.

A combined examination of FIGS. 1 and 2 shows a brake lining with two adapters 5, 6 that come into contact with the force-application zones 3, 4 on the bottom of a lining carrier plate 1. As can be seen in FIG. 1, the force-application zones 3, 4 are configured as circular-symmetrical circles. In the middle of the force-transmission zone 3, the lining carrier plate 1 has a through-opening 7 into which the appertaining adapter 5 engages with a projection 9 in order to affix the adapter 5 and the lining carrier plate 1. Owing to this positive connection created between the adapter 5 and the carrier plate 1 in the radial direction 11 and in the circumferential direction 12, it is possible to effectively prevent the adapter 5 from slipping with respect to the lining carrier plate 1.

An insulating layer 13 is provided between the adapter 5 and the rear surface of the lining carrier plate 1 (located at the bottom in FIG. 2) facing away from the friction lining 2. This insulating layer 13 has sufficient elasticity and compressibility to mechanically decouple the brake lining or the lining carrier plate 1 from a brake cam that comes into contact with the bottom of the adapter 5. Moreover, the insulating layer 13 has a relatively low thermal conductivity, so that the insulating layer 13 can also provide an advantageous thermal decoupling between the brake lining and the brake cylinder or the brake cam.

The adapter 6 is structured differently from the adapter 5. On its surface facing the force-application zone 4 of the lining carrier plate 1, this adapter likewise has an insulating layer 13. However, the adapter 6 has a total of two cylindrical or conical depressions 10 into which corresponding projections 8 of the lining carrier plate 1 come to lie when in the assembled position shown in FIG. 2. The two projections 8 or depressions 10 are arranged symmetrically to the center of the second force-application zone 4 of the lining carrier plate 1, as indicated in FIG. 1. The use of two holding means of a force-application zone 4 that are at a distance from each other concurrently ensures that the adapter 4 cannot twist with respect to the carrier plate 1.

Elevations or projections 20 corresponding to the depressions 10 formed on the top are located on the bottom, that is to say, on the side of the adapter 6 facing away from the lining carrier plate 1. The geometry and the position of the elevations 20 and of the opposite depressions 10 on the adapter 6 can be made by means of a local material deformation, especially by means of stamping. The elevations or the projections 20, in turn, provide tried and true holding means for the cam or for the pressure piece of the brake piston, which engages with the adapter 6 and which is not explicitly shown in the figures.

The same applies to the projection 9 formed on the adapter 5 and to the depression 19 provided on its bottom.

In the area of the holding means 7, 8, 9, 10, the insulating layer 13 has cutouts so as not to impair the positive fit that can be established between the adapter 5, 6 and the lining carrier plate 1. Moreover, it is provided that the surface area of the holding means 7, 8, 9, 10 is kept as small as possible with respect to the surface area of the appertaining force-application zone 3, 4 since, due to the fact that the insulating layer 13 is not present in the area of the holding means 7, 8, 9, 10, there can be an increased thermal or acoustic coupling between the lining carrier plate and the appertaining adapter 5, 6 in these places.

Owing to the minimization of the surface area of the holding means 7, 8, 9, 10, such thermal and mechanical couplings can be reduced to a minimum. The shape of the holding means 7, 8, 9, 10 configured as projections and depressions is essentially cylindrical in the embodiment shown. However, it can also be square, rectangular, hexagonal, or else provided with flat surfaces or be configured conically. Such a conical configuration concurrently constitutes an insertion aid for when the adapter 5, 6 and the lining carrier plate 1 are joined, namely, when the parts are assembled so as to latch, so to speak, or are inserted into each other in the axial direction.

While preferred embodiments of the invention have been described and illustrated here, various changes, substitutions and modifications to the described embodiments will become apparent to those of ordinary skill in the art without thereby departing from the scope and spirit of the invention.

LIST OF REFERENCE NUMERALS 1 lining carrier plate
2 friction lining
3 force-application zone
4 force-application zone
5 adapter
6 adapter
7 through-opening
8 projection
9 projection
10 depression
11 radial direction
12 circumferential direction
13 insulating layer
14 axial direction
18 depression
19 depression
20 projection

The invention claimed is:

1. A brake lining for a disc brake, comprising:
   a carrier plate (1) having a first side adapted for contact with a friction lining (2) and having an opposite side, wherein the carrier plate (1) on the opposite side defines at least one force-application zone (3, 4) comprising an area that is less than the total surface area of the opposite side, said carrier plate (1) having a thickness between the first side and the opposite side;
   an insulating layer (13); and
   an adapter (5, 6) formed of metal that is detachably joined to the force-application zone (3, 4) by first nonadhesive holding means (8, 9), the first nonadhesive holding means comprising a first elevation or a first depression, said adapter (5, 6) having a side facing the carrier plate and in contact with the force-application zone (3, 4) indirectly through the insulating layer (13), and having a side facing away from the carrier plate,
   said adapter (5, 6) having a thickness between the side facing the carrier plate and the side facing away from the carrier plate that is at least the same as or greater than a thickness of the carrier plate (1) from the first side to the opposite side and with the side facing the carrier plate having an area substantially the same as or less than the area of the force-application zone (3, 4),
   said adapter (5, 6) comprising a second elevation (20) or a second depression (19) on the side facing away from the carrier plate (1), said second elevation or second depression configured to engage to a brake cam, said second elevation (20) corresponding in location and peripheral shape to said first depression (10) formed in an opposite side of said adapter (5, 6) facing toward the carrier plate (1) or said second depression (19) corresponding in location and peripheral shape to the first projection formed in the opposite side of said adapter (5, 6) facing toward the carrier plate (1);

wherein second nonadhesive holding means (8, 9) are provided in or on the opposite side of the carrier plate (1) and engages the first nonadhesive holding means of the adapter without adhesive, so that relative movement between the adapter (5, 6) and the carrier plate (1) is retarded at least in the radial direction (11) and in the circumferential direction (12) while the adapter (5, 6) still remains detachable from the force-application zone (3, 4) of the carrier plate (1); and wherein the insulating layer (13) is arranged between the carrier plate (1) and the adapter (5, 6), wherein the first nonadhesive holding means or the second nonadhesive holding means (8, 9) pass through the insulating layer (13).

2. The brake lining according to claim 1, wherein the second holding means (7, 8) on the carrier plate opposite side is arranged in the force-application zone (3, 4) and is configured either as a third elevation (8) extending from the plane of the carrier plate or as a third depression (7) that is set back from the plane of the carrier plate.

3. The brake lining according to claim 1, wherein the force-application zone (3, 4) defines a surface area of the opposite side of the carrier plate, and the second holding means (7, 8) occupies at the maximum 30% of the surface area of the force-application zone (3, 4).

4. The brake lining according to claim 2, wherein the third depression (7) is configured as a through-opening.

5. The brake lining according to claim 1, wherein the second holding means (8) on the carrier plate opposite side are configured to have a cylindrical or conical shape.

6. The brake lining according to claim 2, wherein the third elevation (8) of the force-application zone on the opposite side of the carrier plate (1) is associated with the second elevation (20) of the adapter (6).

7. The brake lining according to claim 6, wherein the third depression (7, 18) and third elevation (8) provided on the opposite side of the carrier plate can be made by means of stamping or a comparable deformation process from a plate that is configured essentially flat.

8. The brake lining according to claim 1, wherein the second holding means (7, 8) are arranged centered and/or symmetrically with respect to the geometry of the force-application zone (3, 4).

9. The brake lining according to claim 1, wherein the adapter (5, 6) is detachably arranged on the opposite side of the carrier plate (1) by means of the first holding means (7, 8) and the second holding means.

10. The brake lining according to claim 1, wherein the insulating layer (13) has graphite or aramid fibers or a combination of such fibers bonded or vulcanized with rubber or phenol resins or a combination of rubber and phenol resins.

11. The brake lining according to claim 1, wherein the carrier plate (1) is configured as a cast part or as a steel plate.

12. A disc brake for commercial vehicles, comprising at least one brake lining according to claim 1.

* * * * *